United States Patent [19]

Farnos et al.

[11] Patent Number: 5,204,076
[45] Date of Patent: Apr. 20, 1993

[54] ZEOLITES DERIVATIZED WITH SULFONIC ACIDS

[75] Inventors: Maria D. Farnos, Wilmington, Del.; Michael E. Landis, Woodbury, N.J.

[73] Assignee: Mobil Oil Corporation, Fairfax, Va.

[21] Appl. No.: 732,841

[22] Filed: Jul. 16, 1991

[51] Int. Cl.$^5$ .............................................. C01B 33/34
[52] U.S. Cl. ..................................... 423/700; 502/60; 502/77; 502/85; 502/168; 502/62; 423/DIG. 27
[58] Field of Search ............... 423/326, 328, 329, 118; 502/60, 62, 85, 64, 77, 168, 170, 159

[56] References Cited

U.S. PATENT DOCUMENTS

| | | | |
|---|---|---|---|
| 3,691,099 | 9/1972 | Young | 502/62 |
| 3,980,586 | 9/1976 | Mitchell | 502/64 |
| 4,478,949 | 10/1984 | Kaeding | 502/85 |
| 4,683,216 | 7/1987 | Farcasiu | 502/159 |
| 4,847,223 | 7/1989 | Le Van Mao et al. | 502/62 |

FOREIGN PATENT DOCUMENTS 169026 1/1986 European Pat. Off. .
258726 3/1988 European Pat. Off. .

OTHER PUBLICATIONS

K. Tanabe et al., Stud. Surf Sci. Catalysis, vol. 44, pp. 99–110 (1988).

Primary Examiner—R. Bruce Breneman
Attorney, Agent, or Firm—Alexander J. McKillop; Malcolm D. Keen; Marina V. Schneller

[57] ABSTRACT

The invention relates to sulfonic acid derivatives of crystalline porous materials having uniform pore size with an average pore size greater than 5 Angstroms or a Constraint Index of ten or less. In a preferred embodiment an acid treated crystalline porous material is reacted with a reagent to form the sulfonic acid derivative. The new products can be used as acid catalysts for acid catalyzed reactions. An example is the use of these materials in acid catalyzed etherification of methanol with isobutene.

10 Claims, No Drawings

ZEOLITES DERIVATIZED WITH SULFONIC ACIDS

FIELD OF THE INVENTION

The invention relates to sulfonic acid derivatives of crystalline porous materials having uniform pore size with an average pore size greater than 5 Angstroms or a Constraint Index of ten or less. In a preferred embodiment an acid treated crystalline porous material is reacted with a reagent to form the sulfonic acid derivative. The new products can be used as acid catalysts for acid catalyzed reactions. An example is the use of these materials in acid catalyzed etherification of methanol with isobutene. Some other acid catalyzed reactions include $C_3$-$C_4$ alkylation reactions, isomerization of paraffins, and xylene isomerization.

BACKGROUND OF THE INVENTION

The term "crystalline", used to refer to these materials, relates to the ordered definite crystalline structure of the material which is unique and thus identifiable by a characteristic X-ray diffraction pattern.

The term porous as it refers to such material relates to pores, or channels, of uniform size and channel systems which are uniquely determined by unit structure of the material. The uniform pore size and/or channel systems allow such a material to selectively absorb molecules of certain dimensions and shapes. In the art, microporous material having pores, or channels, of less than 20 Angstroms, can be divided into small, medium and large pore by the diameters of those pores, or channels. The pores of the small pore material have an average diameter of less than 5 Angstroms; medium size pores range from an average diameter of about 5 to about 7 Angstroms, and large pore silicates indicates a diameter of greater than about 7 Angstroms. The word "average" is used to refer to diameter to embrace those species in which the pore is elliptical. Alternatively, the demarcation between small, medium, and large pore materials can be based on the following sorption properties (measured at room temperature for crystallites having a minimum dimension of 0.1 micron):

1. Small pore: n-$C_6$/i-$C_6$ sorption ratio greater than approximately 10.
2. Medium pore: n-$C_6$/i-$C_6$ is less than 10 and n-$C_6$/mesitylene sorption ratio greater than approximately 5.
3. Large pore: n-$C_6$/mesitylene sorption ratio less than approximately 5.

In the art, zeolites are a subclass of crystalline porous silicates. Zeolites can contain aluminum as well as silicon. In some zeolites, the upper limit of the silicon/aluminum atomic ratio is unbounded. ZSM-5 is one such example wherein the silicon/aluminum atomic ratio is at least 2.5 and up to infinity. By way of illustration, U.S. Pat. No. 3,941,871, reissued as RE 29,948, discloses a porous crystalline silicate made from a reaction mixture containing no deliberately added aluminum and exhibiting the X-ray diffraction pattern characteristic of ZSM-5 zeolites; in certain examples tin is deliberately added to the silicate synthesis mixture.

Zeolites can be acidic or non-acidic, depending on the framework aluminum content and on the amount of compensating cations, such as $Na^+$, $K^+$, etc. Acidity is attributable to, for example, the hydroxyl groups bonded to the framework aluminum of the zeolite.

SUMMARY OF THE INVENTION

The invention relates to a catalytically effective crystalline porous material which contains sulfonic acid groups or derivatives thereof. The precursor crystalline porous material is a silicate which contains silanol groups reactive with reagents which will provide the sulfonic acid groups or derivatives thereof. The sulfonated product exhibits an acidity greater than its precursor.

Acidic compositions can be useful in acid catalyzed reactions, such as alcohol condensation and alcohol etherification, toluene disproportionation, xylene isomerization, alkene conversion and methanol conversion. Haag et al, "The Active Site of Acidic Aluminosilicate Catalysts," *Nature,* Vol. 309, pp.589-591 (June 1985).

DETAILED DESCRIPTION OF THE INVENTION

The materials produced herein are "crystalline" which refers to the ordered definite crystalline structure of the material which is unique and thus identifiable by a characteristic X-ray diffraction pattern.

The term "porous" as it refers to such material relates to uniform pores, or channel systems which are uniquely determined by unit structure of the material. The material has pores, or channels, with an average diameter of greater than about 5 Angstroms. The word "average" is used to refer to diameter to embrace those species in which the pore is elliptical. Alternatively, the demarcation between these materials can be based on the following sorption properties (measured at room temperature for crystallites having a minimum dimension of 0.1 micron): n-$C_6$/mesitylene sorption ratio of less than approximately 5.

The materials of the invention can exhibit a Constraint Index of 10 or less. The method by which Constraint Index is determined is described fully in U.S. Pat. No. 4,016,218, incorporated herein by reference for details of the method. Constraint Index (CI) values for some typical zeolites are described below:

| | CI (at test temperature) |
|---|---|
| ZSM-4 | 0.5 (316° C.) |
| ZSM-5 | 6-8.3 (371° C.-316° C.) |
| ZSM-11 | 5-8.7 (371° C.-316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| MCM-22 | 1.5 (454° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6-2.0 (316° C.-399° C.) |

The above-described Constraint Index is an important characterization of at least some of the materials of the invention. The measurement relates to the relative catalytic shape selectivity of the materials. The very nature of this parameter and the above-referenced procedure by which it is determined, however, admits of the possibility that a given zeolite can be tested under somewhat different conditions and thereby exhibit different Constraint Indices. Constraint Index appears to vary somewhat with the severity of the conversion operation and the presence or absence of binder material. Similarly, other variables such as crystal size of the zeolite, the presence of occluded contaminants, etc., may affect the observed Constraint Index value. It will therefore be appreciated that it may be possible to select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites but that such are the cumulative result of several variables useful in the determination and calculation thereof. Thus, for a given zeolite exhibiting a CI value within the range of 5 or less, depending on the temperature employed during the test method within the range of 290° C. to about 538° C., with accompanying conversion between 10% and 60%, the CI may vary within the indicated range of 5 or less. Accordingly, it will be understood to those skilled in the art that the CI as utilized herein, while affording a highly useful means for characterizing the zeolites of interest, is approximately taking into consideration the manner of its determination including the possibility in some instances of compounding variable extremes. However, in all instances, at a temperature within the above-specified range of 290° C. to about 538° C., the CI will have a value for any given zeolite of interest herein of not greater than about 5 and preferably not greater than about 3; most preferably up to 1.

Zeolite ZSM-4 is taught in British Patent No. 1,117,568; ZSM-20 in U.S. Pat. No. 3,972,983; and zeolite Beta in U.S. Pat. No. 3,308,069, each incorporated herein by reference. Zeolite beta containing framework boron is also described in U.S. Pat. No. 4,656,016 which is relied upon and incorporated by reference herein.

Zeolites, in acid (protonated) form, rather than in ion-exchanged form with compensating cations such as Na+, K+, etc, contain silanol hydroxy groups, as well as hydroxy groups on framework aluminum atoms which may be present. The hydroxy groups provide reactive sites for sulfonation, in accordance with the invention. In a preferred embodiment the reactant crystalline porous silicate, borosilicate or aluminosilicate is in the acid form. Moreover, in a preferred embodiment the reactant crystalline porous silicate, borosilicate or aluminosilicate, in acid form, is depleted in framework element(s) other than silicon. The resulting framework depleted, may be characterized as hydroxylated or as hydroxyl enriched and thereby as containing additional hydroxyl groups compared to the undepleted reactant. The increase in hydroxyl groups is detectable by Fourier Transform Infrared Spectrometry. The additional hydroxyl groups are stable to a temperature of 500° C. At temperatures above 500° C., the material loses the additional hydroxyl groups which allow it to be characterized as hydroxylated; the loss of the hydroxy groups is detectable by Fourier Transform Infrared Spectrometry.

Depletion of framework elements other than silicon can be undertaken by subjecting the reactant crystalline porous silicate, borosilicate or aluminosilicate, to hydrolytic conditions at a pH below 7 or by steaming and/or calcination.

When, as in embodiments herein, the crystalline porous material exhibits an X-ray diffraction pattern of a zeolite and is hydroxyl enriched by framework element depletion, at least some of the additional hydroxy groups may be intrazeolitic, that is, some of the hydroxyl groups may be within the pore structure of the crystal, although some of the additional hydroxyl groups can be on the surface of the crystal. Accordingly, when such a material is subjected to sulfonation, in accordance with the invention, sulfonation reaction can occur within the pore structure of the crystal, as well on the surface of the crystal.

Sulfonation is preferably undertaken with oxides of sulfur, e.g. sulfur trioxide, or with an organic derivative of sulfonic acid, which derivative is free of acidic protons. In a preferred embodiment, these are the sultones which are cyclic aliphatic derivatives of sulfonic acid. Preferred is the the propane sultone:

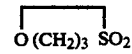

Sulfonation can be undertaken in an organic solvent which is aliphatic or aromatic. Although elevated temperatures may be employed, preferably, the reaction is undertaken at ambient conditions.

The resultant product can be used in acid catalyzed reactions. Acid catalyzed reactions include alcohol condensation and alcohol etherification, toluene disproportionation, xylene isomerization, alkene conversion and methanol conversion. Haag et al; "The Active Site of Acidic Aluminosilicate Catalysts," *Nature*. Vol. 309, pp.589–591 (June 1985). In general, organic compounds such as, for example, those selected from the group consisting of hydrocarbons, alcohols and ethers, are, in acid catalyzed reactions, converted to conversion products such as, for example, aromatics and lower molecular weight hydrocarbons, over the catalytically active form of the composition of this invention by contact under organic compound conversion conditions, including a temperature of from above about ambient to about 800° C. a pressure of from about 0.1 atmosphere (bar) to about 200 atmospheres, a weight hourly space velocity of from about 0.08 hr$^{-1}$ to about 2000 hr$^{-}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions, including a temperature of from about 300° C. to about 800° C., a pressure of from about 0.1 atmosphere (bar) to about 35 atmospheres and a weight hourly space velocity of from about 0.1 to about 100; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 50; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 1 atmosphere to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 50; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

For example, the resultant product can be used in etherification of alcohols. Specifically, etherification conditions are chosen sufficient to maintain the reactants as a liquid phase, generally at superatmospheric pressure and generally below 200 psig; at a temperature of about 30° C. to about 100° C. Etherification of the alcohol can be undertaken at a feed alcohol to olefin (isoolefin) range of from 1:1 to 2:1. With the preferred reactants, methanol and isobutene, good results are achieved if the ratio of methanol to isobutene is between 1.1:1 and 1.5:1. The etherification product, e.g., t-butyl methyl ether, can be separated from reactants by conventional techniques, distillation, fractional distillation, etc.

In the case of many catalysts, it is desired to incorporate the material hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the material of the invention, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good physical strength, because in petroleum refinery processing, the catalyst is often subjected to conditions which tend to break the catalyst down into powder-like materials which cause problems in processing.

Naturally occurring clays which can be composited with the hereby synthesized material include the montmorillonite and kaolin families which include the sub bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the material hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usually in the range of about 10 to about 70 percent by weight of the composite.

EXAMPLES

Example 1

1 kg. of a crystalline borosilicate, exhibiting the X-ray diffraction pattern of zeolite beta was stirred in 7.5 l. of 1M ammonium nitrate for 1 hour at room temperature. The product was filtered, restirred in 7.5 l. of 1M ammonium nitrate for 1 hour at room temperature, and filtered again. The product was washed with 15 l of water and dried at 250° F. The dried powder was calcined for 2 hours in $N_2$ (5° F./min.) at 1000° F. and then in air at 1000° F. until white. The product had the following composition (wt. %): Na 0.0175; B 1.21; $SiO_2$ 91.5; and ash of 99.2.

The product was then treated with acid to remove boron and generate silanol groups. 200 grams of it was stirred in 1 l. of 0.01M HCl at room temperature for 1 hour. The product was filtered and the treatment was repeated. The product was then washed with 2 l. of water and dried at 250° F. for one hour. The resulting silanol-rich zeolite beta had the following composition (in wt. %): Na 0.01%; less than 0.01% B; $SiO_2$ 85.3%; and ash 88.7%.

Example 2

Fifty (50) grams of acid extracted borosilicate from Example 1 exhibiting the X-ray diffraction pattern of zeolite beta was added to 250 ml of toluene, with stirring. Then to the stirred mixture, 25 grams of propane sultone in 100 ml tolene was added dropwise over a 14 min interval. The mixture was stirred overnight at room temperature, filtered, rinsed with 2 separate portions of toluene, and dried overnight at room temperature. The propylsulfonic acid derivatized crystalline zeolite beta had the following composition in weight percent: $SiO_2$ 82.7%; C 4.24%; and S 2.33%.

The C/S molar ratio is 4.8 (theory being 3.0) most likely due to the presence of adsorbed toluene in addition to the organic acid group.

Fourier Transform Infrared Spectrographs of the acid extracted borosilicate zeolite beta, the precursor, and its derivatized product revealed different spectra.

In the sulfonated derivative, the propyl sulfonic acid group is detected at 3360 cm$^{-1}$ due to S-OH; 2900-2950 cm$^{-1}$ due to (CH$_2$) and 1346 cm$^{-1}$ due to S=O. FTIR studies revealed that the sulfonated derivative remained reasonably stable up to 480° F.

Thus it is apparent that there has been provided, in accordance with the invention, a catalyst, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which are embraced by the appended claims.

What is claimed is:

1. A process for forming a sulfonated derivative of a microporous crystalline material produced by reacting an oxide of sulfur with a crystalline porous material having silanol groups wherein said crystalline porous material can exhibit a Constraint Index of 10 or less comprising
    providing a crystalline porous material, wherein the crystalline porous material has an ordered crystalline structure and comprises oxygen atoms, silicon atoms, and at least one framework element therein, wherein said framework element is selected from the group consisting of aluminum, boron, and gallium, and
    wherein said crystalline porous material can exhibit a Constraint Index of 10 or less.
    subjecting said crystalline porous material to acid conditions effective to remove at least a portion of said at least one framework element, to form a product depleted in said framework element which retains said ordered crystalline structure and to generate silanol groups therein;
    reacting said silanol group-containing product with an oxide of sulfur to form a sulfonic acid derivative of said product.

2. The process of claim 1, wherein the crystalline porous material is reacted with an organic derivative of a sulfonic acid.

3. The process of claim 1, wherein the crystalline porous material is reacted with propane sultone.

4. The process of claim 1, wherein the framework element is aluminum or boron.

5. The process of claim 1, wherein the porous crystalline material is zeolite beta.

6. A process for forming a sulfonated derivative of a microporous crystalline material produced by reacting an oxide of sulfur with a crystalline porous material having silanol groups wherein said crystalline porous material can exhibit a Constraint Index of 10 or less comprising
    providing a sample of zeolite beta which comprises oxygen atoms, silicon atoms, and at least one framework element selected from the group consisting of aluminum, boron, and gallium, and
    subjecting said crystalline porous material to acid conditions effective to remove at least a portion of said at least one framework element, to form a product depleted in said framework element which retains said ordered crystalline structure to generate silanol groups therein;
    reacting said silanol groups with an oxide of sulfur to form a sulfonic acid derivative of said sample.

7. The process of claim 6, wherein the crystalline porous material is reacted with propane sultone.

8. The process of claim 6, wherein the framework element is aluminum or boron.

9. The process of claim 8, wherein the crystalline porous material is reacted with propane sultone.

10. The process of claim 3, wherein the framework element is aluminum or boron.

* * * * *